US012629303B2

(12) United States Patent
Tanaka et al.

(10) Patent No.: US 12,629,303 B2
(45) Date of Patent: May 19, 2026

(54) FLUID MATTRESS AND BED SYSTEM

(71) Applicant: Paramount Bed Co., Ltd., Tokyo (JP)

(72) Inventors: Makoto Tanaka, Tokyo (JP); Masakazu Harada, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 52 days.

(21) Appl. No.: 18/904,680

(22) Filed: Oct. 2, 2024

(65) Prior Publication Data

US 2026/0020998 A1 Jan. 22, 2026

(51) Int. Cl.

| | |
|---|---|
| ***A61G 7/057*** | (2006.01) |
| ***A47C 27/08*** | (2006.01) |
| ***A47C 27/10*** | (2006.01) |
| *A61G 7/10* | (2006.01) |

(52) U.S. Cl.

CPC ........ *A61G 7/05776* (2013.01); *A47C 27/081* (2013.01); *A47C 27/082* (2013.01); *A47C 27/083* (2013.01); *A47C 27/10* (2013.01); *A61G 7/05769* (2013.01); *A61G 7/1021* (2013.01); *A61G 2203/32* (2013.01); *A61G 2203/34* (2013.01)

(58) Field of Classification Search

CPC ............ A61G 7/05776; A61G 7/05769; A61G 2203/30; A61G 2203/32; A61G 2203/34; A61G 7/1021; A47C 27/08; A47C 27/081; A47C 27/082; A47C 27/083; A47C 27/10

USPC .......................... 5/706, 710, 713, 655.3, 654

See application file for complete search history.

(56) References Cited

U.S. PATENT DOCUMENTS

| | | | | | |
|---|---|---|---|---|---|
| 3,008,465 A * | 11/1961 | Gal | A61G 7/05776 601/149 |
| 4,852,195 A * | 8/1989 | Schulman | A61G 7/05776 297/DIG. 8 |
| 5,090,076 A * | 2/1992 | Guldager | A47C 27/10 5/713 |
| 5,243,721 A * | 9/1993 | Teasdale | A61G 7/05776 5/713 |
| 5,267,364 A * | 12/1993 | Volk | A61G 7/05776 5/713 |

(Continued)

FOREIGN PATENT DOCUMENTS

| | | | |
|---|---|---|---|
| EP | 528666 A1 * | 2/1993 | A61G 7/057 |
| JP | 2021-049435 A | 4/2021 | |

(Continued)

*Primary Examiner* — Robert G Santos

(74) *Attorney, Agent, or Firm* — Kim & Stewart LLP

(57) ABSTRACT

A fluid mattress is provided with a fluid supply unit, a fluid path, a plurality of first cells connected to each other, a plurality of second cells connected to each other, a plurality of third cells connected to each other, a pressure sensor, and a controller. The controller measures first time during when a pressure in the first cell changes from a third pressure to a fourth pressure when implementing a first mode by shifting from a third mode, measures second time during when a pressure in the second cell changes from the third pressure to the fourth pressure when implementing a second mode by shifting from the first mode, measures third time during when a pressure in the third cell changes from the third pressure to the fourth pressure when implementing a third mode by shifting from the second mode, and determines a position of a sacral region of a user based on the first time, the second time, and the third time.

7 Claims, 10 Drawing Sheets

(56) References Cited

U.S. PATENT DOCUMENTS

| | | | | |
|---|---|---|---|---|
| 5,920,934 | A * | 7/1999 | Hannagan | A61G 7/05776 285/914 |
| 2025/0332049 | A1 * | 10/2025 | Tanaka | G05D 16/2022 |

FOREIGN PATENT DOCUMENTS

| | | | | |
|---|---|---|---|---|
| WO | WO-8903203 | A * | 4/1989 | A61G 7/04 |
| WO | WO-0215835 | A1 * | 2/2002 | A47C 27/083 |

* cited by examiner

FLUID MATTRESS AND BED SYSTEM

CROSS-REFERENCE TO RELATED APPLICATIONS

This application is based upon and claims the benefit of priority from the prior Japanese Patent Application No. 2024-117027, filed on Jul. 22, 2024; the entire contents of which are incorporated herein by reference.

FIELD

Embodiments as examples relate to a fluid mattress and a bed system.

BACKGROUND

The angle of a back section can be changed in nursing motorized beds. When the back section is made flat, a user can take a sleeping posture, and when the back section is inclined to perform a back-raising operation, the upper body of the user can be raised.

If a user does not sleep at a suitable position on the motorized bed when the back section is flat, it is difficult to smoothly raise the upper body of the user when the back-raising operation is performed. In a case where the position of the user is largely shifted from a predetermined position, a care giver or the like can visually determine the position of the user. However, in a case where the position of the user is subtly shifted, the care giver or the like is less likely to visually determine the position of the user.

DETAILED DESCRIPTION

Figure 1A:
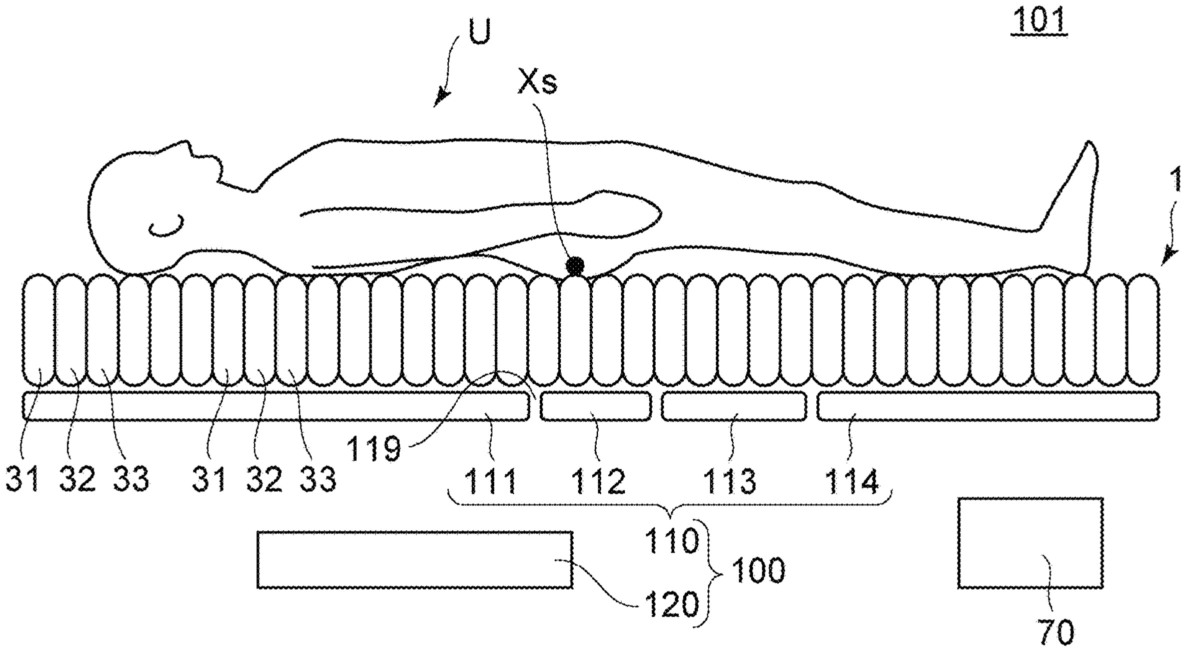
FIGS. 1A and 1B are diagrams illustrating a bed system according to a first embodiment.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component", "system" and the like are intended to refer to, or comprise, a computer-related entity or an entity related to an operational apparatus with one or more specific functionalities, wherein the entity can be either hardware, or a combination of hardware and software in execution.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software stored on a non-transitory electronic memory or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer-readable (or machine-readable) device or computer-readable (or machine-readable) storage/communications media having a computer program stored thereon. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In general, one aspect of the present application is a fluid mattress including:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of a measurement result by the pressure sensor, and controls the fluid supply unit, the first solenoid valve, the second solenoid valve, the third solenoid valve, and the external solenoid valve, in which the controller can implement a first mode in which a pressure in the second cell and a pressure in the third cell are set to be a first pressure, and a pressure in the first cell is set to be equal to or lower than a second pressure lower than the first pressure, a second mode in which a pressure in the third cell and a pressure in the first cell are set to be the first pressure, and a pressure in the second cell is set to be equal to or lower than the second pressure, and a third mode in which a pressure in the first cell and a pressure in the second cell are set to be the first pressure, and a pressure in the third cell is set to be equal to or lower than the second pressure, the controller when implementing the first mode by shifting from the third mode, stops the fluid supply unit, causes the second solenoid valve and the third solenoid valve to be in a closed state, causes the first solenoid valve and the external solenoid valve to be in an open state, and measures first time during when a measurement value by the pressure sensor changes from a third pressure lower than the first pressure and higher than the second pressure to a fourth pressure lower than the third pressure and higher than the second pressure, when implementing the second mode by shifting from the first mode, stops the fluid supply unit, causes the third solenoid valve and the first solenoid valve to be in a closed state, causes the second solenoid valve and the external solenoid valve to be in an open state, and measures second time during when a measurement value by the pressure sensor changes from the third pressure to the fourth pressure, and when implementing the third mode by shifting from the second mode, stops the fluid supply unit, causes the first solenoid valve and the second solenoid valve to be in a closed state, causes the third solenoid valve and the external solenoid valve to be in an open state, and measures third time during when a measurement value by the pressure sensor changes from the third pressure to the fourth pressure, determines that a sacral region of a user is positioned on the first cell when the first time is longer than the second time and the third time, determines that the sacral region is positioned on the second cell when the second time is longer than the third time and the first time, and determines that the sacral region is positioned on the third cell when the third time is longer than the first time and the second time.

Another aspect of the present application is a bed system including:

sections;

an actuator that inclines the sections; and the fluid mattress according to claim 1, wherein the first cell, the second cell, and the third cell are arranged repeatedly on the sections from a head side toward a leg side, and the controller causes, among a group consisting of the one first cell, the one second cell, and the one third cell continuously arranged, when the cell positioned in a center corresponds to a predetermined position at which the sacral region is to be positioned, and the cell positioned adjacent to the cell positioned in the center corresponds to the determined position of the sacral region, the actuator to incline the sections such that the cell positioned in the center is positioned below the cell corresponding to the determined position of the sacral region.

Further another aspect of the present application is a bed system including:

sections;

an actuator that inclines the sections;

a position sensor that detects a position of a sacral region of a user on the sections; and a fluid mattress, wherein the fluid mattress includes:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of measurement results by the position sensor and the pressure sensor, and controls the fluid supply unit, the first solenoid valve, the second solenoid valve, the third solenoid valve, and the external solenoid valve, the first cell, the second cell, and the third cell are arranged repeatedly on the sections from a head side toward a leg side, the controller can implement a first mode in which a pressure in the second cell and a pressure in the third cell are set to be a first pressure, and a pressure in the first cell is set to be equal to or lower than a second pressure lower than the first pressure, a second mode in which a pressure in the third cell and a pressure in the first cell are set to be the first pressure, and a pressure in the second cell is set to be equal to or lower than the second pressure, and a third mode in which a pressure in the first cell and a pressure in the second cell are set to be the first pressure, and a pressure in the third cell is set to be equal to or lower than the second pressure, and the controller causes, among a group consisting of the one first cell, the one second cell, and the one third cell continuously arranged, when the cell positioned in a center corresponds to a predetermined position at which the sacral region is to be positioned, and the cell positioned adjacent to the cell positioned in the center corresponds to the detected position of the sacral region by the position sensor, the actuator to incline the sections such that the cell positioned in the center is positioned below the cell corresponding to the detected position of the sacral region.

First Embodiment

Figure 1B:
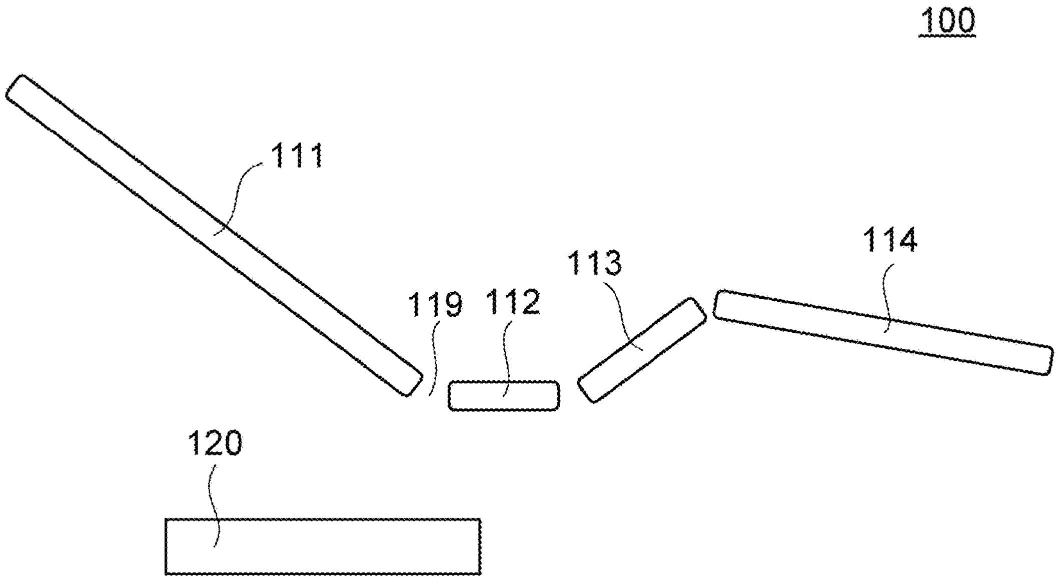

FIGS. 1A and 1B are diagrams illustrating a bed system according to a present embodiment.

As illustrated in FIGS. 1A and 1B, a bed system 101 according to the present embodiment is a nursing or medical bed system. The bed system 101 is used in a home of a user, a care facility, or a medical facility such as a hospital, for example. A user U of the bed system 101 is a care recipient or a patient, for example.

The bed system 101 is provided with a motorized bed 100 and a fluid mattress 1. The motorized bed 100 is provided with sections 110 and an actuator 120. The sections 110 are provided with a back section 111, a seat section 112, an upper leg section 113, and a lower leg section 114 from a head side toward a leg side of the motorized bed 100.

The back section 111 is movable relative to the seat section 112. For example, the back section 111 can be inclined while moving to the head side relative to the seat section 112 so as to displace the head side upward. This operation is called "back-raising". The upper leg section 113 is also movable relative to the seat section 112. For example, the upper leg section 113 is coupled to the seat section 112 in a rotatable manner. The lower leg section 114 is coupled to the upper leg section 113 in a rotatable manner, and operates together with the upper leg section 113.

FIG. 1A illustrates a state where all of the back section 111, the seat section 112, the upper leg section 113, and the lower leg section 114 are flat. FIG. 1B illustrates a back-raising state in which the back section 111 is inclined relative to the seat section 112, the upper leg section 113 is inclined relative to the seat section 112, and the lower leg section 114 operates together with the upper leg section 113. In FIG. 1B, only the motorized bed 100 is illustrated, and the fluid mattress 1 is omitted.

The actuator 120 can incline the entire sections 110. The actuator 120 can also cause the sections 110 to be a state of being parallel to the floor, can also incline the sections 110 such that the head side is higher than the leg side, and can also incline the sections 110 such that the leg side is higher than the head side. The actuator 120 can also incline the back section 111 relative to the seat section 112, and can also incline the upper leg section 113 relative to the seat section 112. A plurality of the actuators 120 having different functions may be provided. For example, an actuator that inclines the entire sections 110, an actuator that inclines the back section 111, and an actuator that inclines the upper leg section 113 may be provided separately.

Next, a configuration of the fluid mattress 1 will be described.

Figure 2:
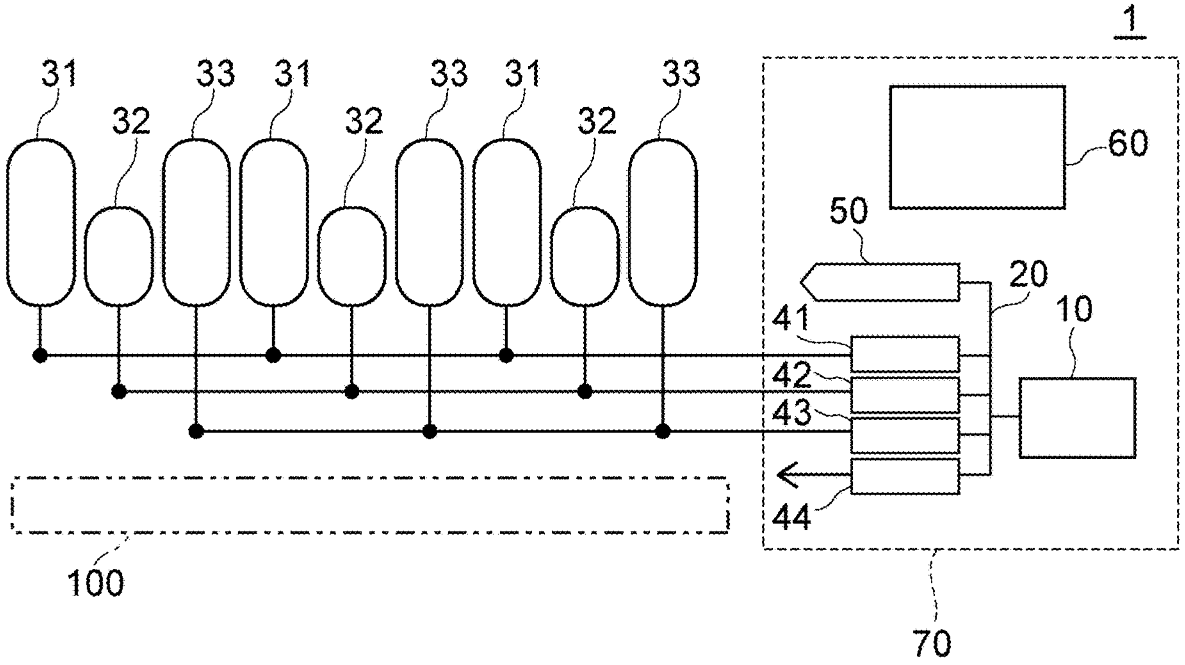
FIG. 2 is a diagram illustrating a fluid mattress according to the first embodiment.

FIG. 2 is a diagram illustrating the fluid mattress according to the present embodiment.

As illustrated in FIG. 2, the fluid mattress 1 is provided with an air blowing apparatus 10, a fluid path 20, air cells 31 to 33, solenoid valves 41 to 44, a pressure sensor 50, and a controller 60. The air cells 31 to 33 are disposed on the sections 110. The air blowing apparatus 10, the solenoid valves 41 to 44, the pressure sensor 50, and the controller 60 are disposed in a drive unit 70, and are disposed below the sections 110, for example.

The air blowing apparatus 10 is a fluid supply unit capable of supplying the air as a fluid. The air blowing apparatus 10 may be a pump, for example. The fluid path 20 is connected to the air blowing apparatus 10, and is supplied with the air from the air blowing apparatus 10. In present description herein, "connection" indicates that the fluid can circulate.

Pluralities of the air cells 31 to 33 are provided, and the air cells 31 to 33 are arranged repeatedly along a direction from the head side toward the leg side of the motorized bed 100. The air cells 31 to 33 are made of a soft sheet material, and can seal the air inside. For example, the air cells 31, 32, and 33 have the same sizes and the same shapes, respectively.

Each of the solenoid valves 41 to 44 includes a first end and a second end, and can switch whether to permit or prohibit the circulation of the air between the first end and the second end. The plurality of the air cells 31 (first cells) are connected to each other, and are connected to the first end of the solenoid valve 41 (first solenoid valve). The plurality of the air cells 32 (second cells) are connected to each other, and are connected to the first end of the solenoid valve 42 (second solenoid valve). The plurality of the air cells 33 (third cells) are connected to each other, and are connected to the first end of the solenoid valve 43 (third solenoid valve).

In the fluid mattress 1, pluralities of air cells having the same sizes and the same shapes respectively and arranged on a line are divided into three flow paths by the solenoid valves 41 to 43. The first end of the solenoid valve 44 (external solenoid valve) is connected to an outside of the fluid mattress 1, and can suction or discharge the atmosphere as the air. The second ends of the solenoid valves 41 to 44 are connected to the fluid path 20.

The pressure sensor 50 measures a pressure of the air in the fluid path 20. The controller 60 receives input of a measurement result by the pressure sensor 50, and controls the air blowing apparatus 10 and the solenoid valves 41 to 44. The controller 60 can execute a bedsore prevention operation. In a case where the controller 60 executes the bedsore prevention operation, the controller 60 repeatedly executes a first mode, a second mode, and a third mode, which are described later.

Next, an operation of the bed system according to the present embodiment will be described.

Firstly, an overall operation of the fluid mattress 1 will be described.

Figure 3:
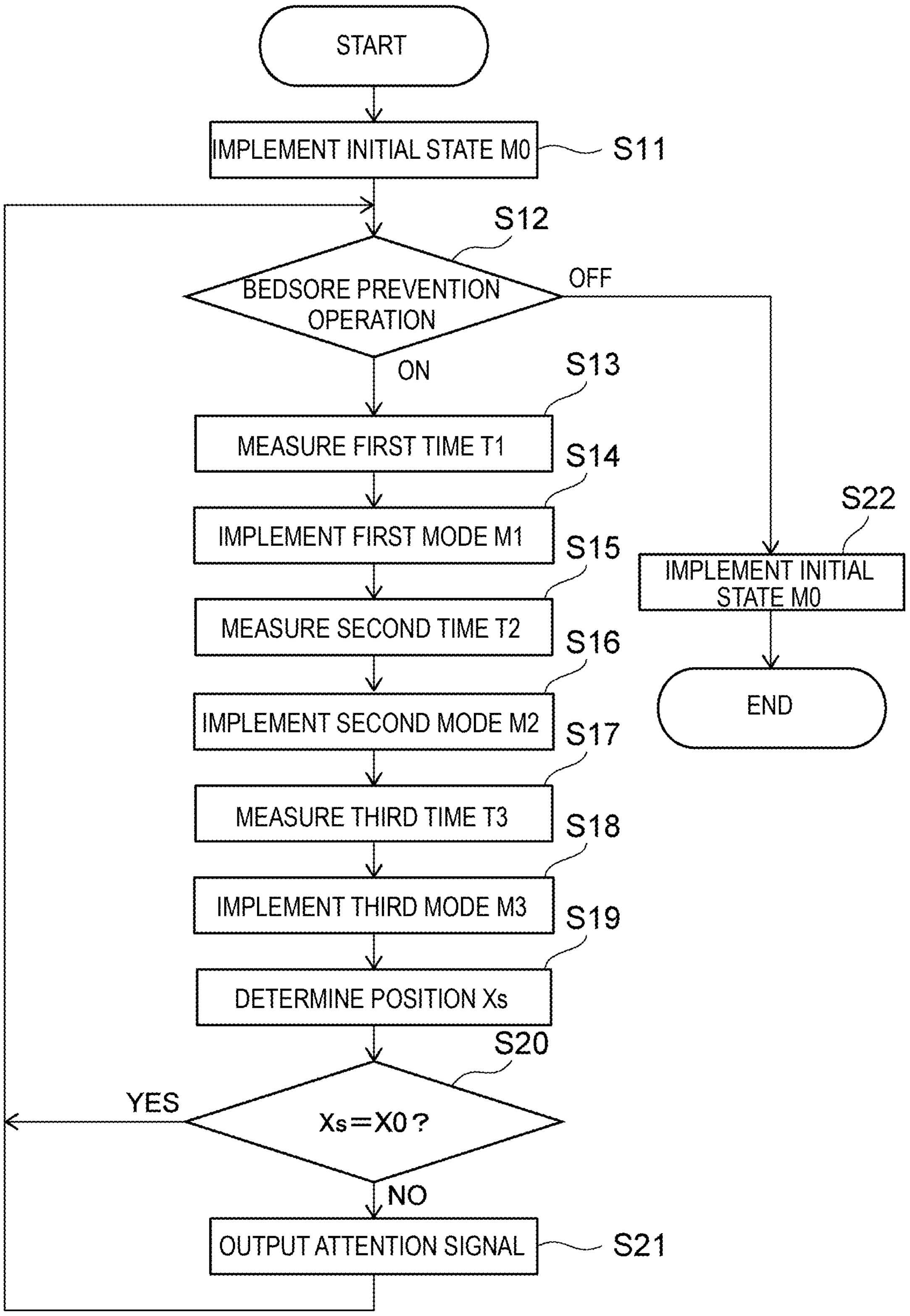
FIG. 3 is a flowchart illustrating an operation of the fluid mattress according to the first embodiment.

FIG. 3 is a flowchart illustrating the operation of the fluid mattress according to the present embodiment.

Figure 4A:
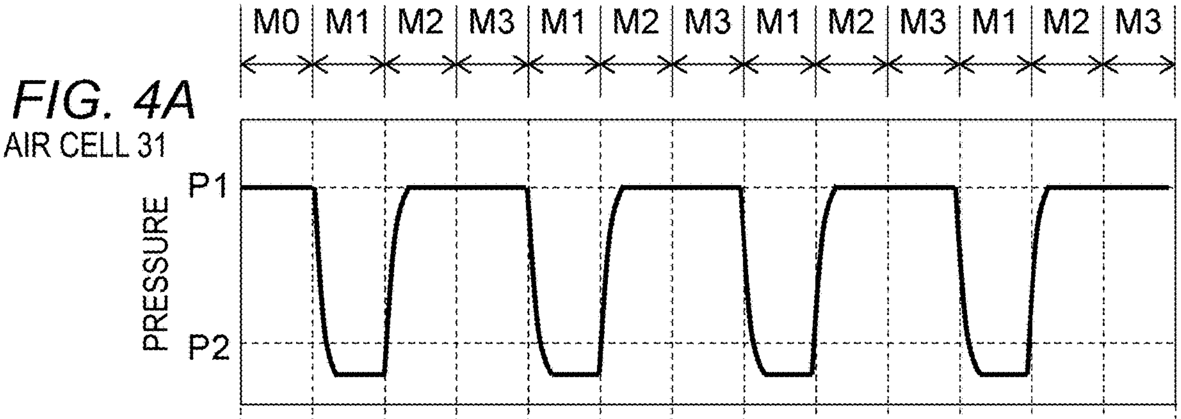
FIGS. 4A to 4C are graphs each illustrating a change in a pressure in each air cell, in which the horizontal axis represents time and the longitudinal axis represents a pressure in each air cell.
Figure 4B:
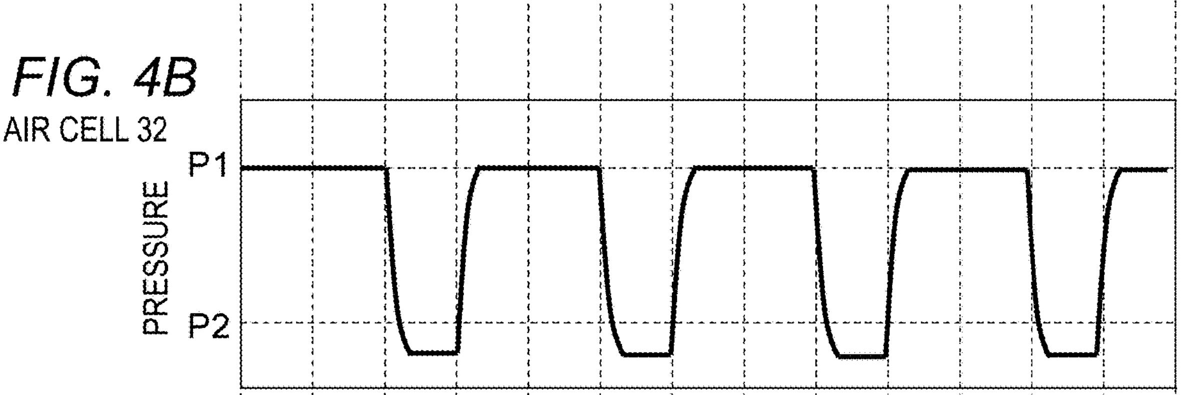
Figure 4C:
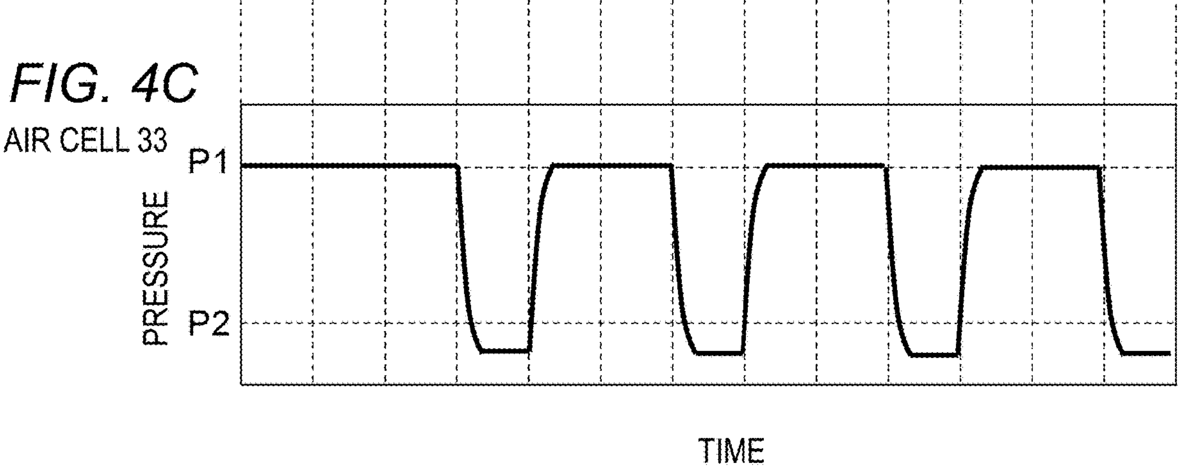

FIGS. 4A to 4C are graphs each indicating a change in the pressure in each air cell, in which the horizontal axis represents time and the longitudinal axis represents a pressure in each air cell: FIG. 4A illustrates a pressure change in the air cell 31; FIG. 4B illustrates a pressure change in the air cell 32; and FIG. 4C illustrates a pressure change in the air cell 33.

As illustrated at a step S11 in FIG. 3, and FIGS. 4A to 4C, the controller 60 implements an initial state M0. In the initial state M0, the controller 60 sets the internal pressures in all the air cells 31 to 33 to a first pressure P1. The first pressure P1 is a pressure to allow all the air cells 31 to 33 to be maintained in a moderately inflated state in a state where the user U has gotten on the fluid mattress 1, and allow the air cells 31 to 33 to support the user comfortably. For example, the first pressure P1 is a pressure at which a contact area between the air cells 31 to 33 and the user is the maximum. For example, a value of the first pressure P1 is set in advance in association with a body weight of the user.

Next, as illustrated at a step S12 in FIG. 3, the controller 60 determines whether the bedsore prevention operation is on or off. If the bedsore prevention operation is on, the controller 60 causes the operation to proceed to a step S13.

At the step S13, the controller 60 measures a first time T1. The controller 60 measures the first time T1 when implementing a first mode M1 by shifting from the initial state M0 or a third mode M3. A measurement method of the first time T1 is described later.

Next, the controller 60 causes the operation to proceed to a step S14, and executes the first mode M1. As illustrated in FIG. 2 and FIGS. 4A to 4C, in the first mode M1, the controller 60 sets the pressures in the air cell 32 and the air cell 33 to the first pressure P1, and sets the pressure in the air cell 31 to be equal to or lower than a second pressure P2. The second pressure P2 is lower than the first pressure P1. The pressure in the air cell 31 is set to a pressure close to the atmospheric pressure, for example. The user is supported by the air cells 32 and 33, and is not supported by the air cell 31. The time of the first mode M1 is set to five minutes, for example.

Next, the controller 60 causes the operation to proceed to a step S15, and measures a second time T2. The controller 60 measures the second time T2 when implementing a second mode M2 by shifting from the first mode M1. A measurement method of the second time T2 is described later.

Next, the controller 60 causes the operation to proceed to a step S16, and executes the second mode M2. In the second mode M2, the controller 60 returns the pressure in the air cell 31 to the first pressure P1, and sets the pressure in the air cell 32 to be equal to or lower than the second pressure P2. The pressure in the air cell 32 is set to a pressure close to the atmospheric pressure, for example. The user is supported by the air cells 31 and 33, and is not supported by the air cell 32. The time of the second mode M2 is set to five minutes, for example. FIG. 2 illustrates the second mode M2.

Next, the controller 60 causes the operation to proceed to a step S17, and measures a third time T3. The controller 60 measures the third time T3 when implementing the third mode M3 by shifting from the second mode M2. A measurement method of the third time T3 is described later.

Next, the controller 60 causes the operation to proceed to a step S18, and executes the third mode M3. In the third mode M3, the controller 60 returns the pressure in the air cell 32 to the first pressure P1, and sets the pressure in the air cell 33 to be equal to or lower than the second pressure P2. The pressure in the air cell 33 is set to a pressure close to the atmospheric pressure, for example. The user is supported by the air cells 31 and 32, and is not supported by the air cell 33. The time of the third mode M3 is set to five minutes, for example.

Next, the controller 60 causes the operation to proceed to a step S19, and determines a position Xs of a sacral region of the user U, based on measurement values in the first time T1, the second time T2, and the third time T3. A determination method is also described later.

Next, the controller 60 causes the operation to proceed to a step S20, determines whether the position Xs of the sacral region is a predetermined position X0, and causes the operation to return to the step S12 if the position Xs of the sacral region is the predetermined position X0.

At the step S12, if the bedsore prevention operation is on, the controller 60 causes the operation to proceed again to the step S13, and repeats the operation from the step S13 to the step S20. If the bedsore prevention operation is off, the controller 60 causes the operation to proceed to a step S22 from the step S12, implements the initial state M0, and then ends the operation. After the controller 60 has ended the operation, the controller 60 also maintains the internal pressures in the air cells 31 to 33 to the first pressure P1.

At the step S20, if the controller 60 has determined that the position Xs of the sacral region is not the predetermined position X0, the controller 60 causes the operation to proceed to a step S21, and outputs an attention signal. Details of the attention signal is described later. Thereafter, the controller 60 causes the operation to return to the step S12.

If the bedsore prevention operation is on, the controller 60 sequentially decreases the internal pressures in the plurality of the air cells 31, the plurality of the air cells 32, the plurality of the air cells 33 to be equal to or lower than the second pressure P2. This moves little by little a site in the body of the user U that is not pressed by the air cells, thereby suppressing the generation of bedsore.

Next, each operation will be described in details.

Firstly, an implementation method of the initial state M0 illustrated at the step S11 in FIG. 3 will be described.

As illustrated in FIG. 2 and FIGS. 4A to 4C, in the initial state M0, the controller 60 causes the solenoid valves 41 to 43 to be in an open state and the solenoid valve 44 to be in a closed state, and drives the air blowing apparatus 10. The controller 60 injects the air from the air blowing apparatus 10 via the fluid path 20 and the solenoid valves 41 to 43 into the air cells 31 to 33. When a measurement value by the pressure sensor 50 has reached the first pressure P1, the controller 60 stops the air blowing apparatus 10. The solenoid valves 41 to 43 are in the open state, so that the air cells 31 to 33 are connected to each other to have the same pressure. In this manner, the pressures in all the air cells 31 to 33 are set to the first pressure P1.

Next, the measurement method of the first time T1 illustrated at the step S13, the measurement method of the second time T2 illustrated at the step S15, and the measurement method of the third time T3 illustrated at the step S17, in FIG. 3, will be described.

Figure 5:
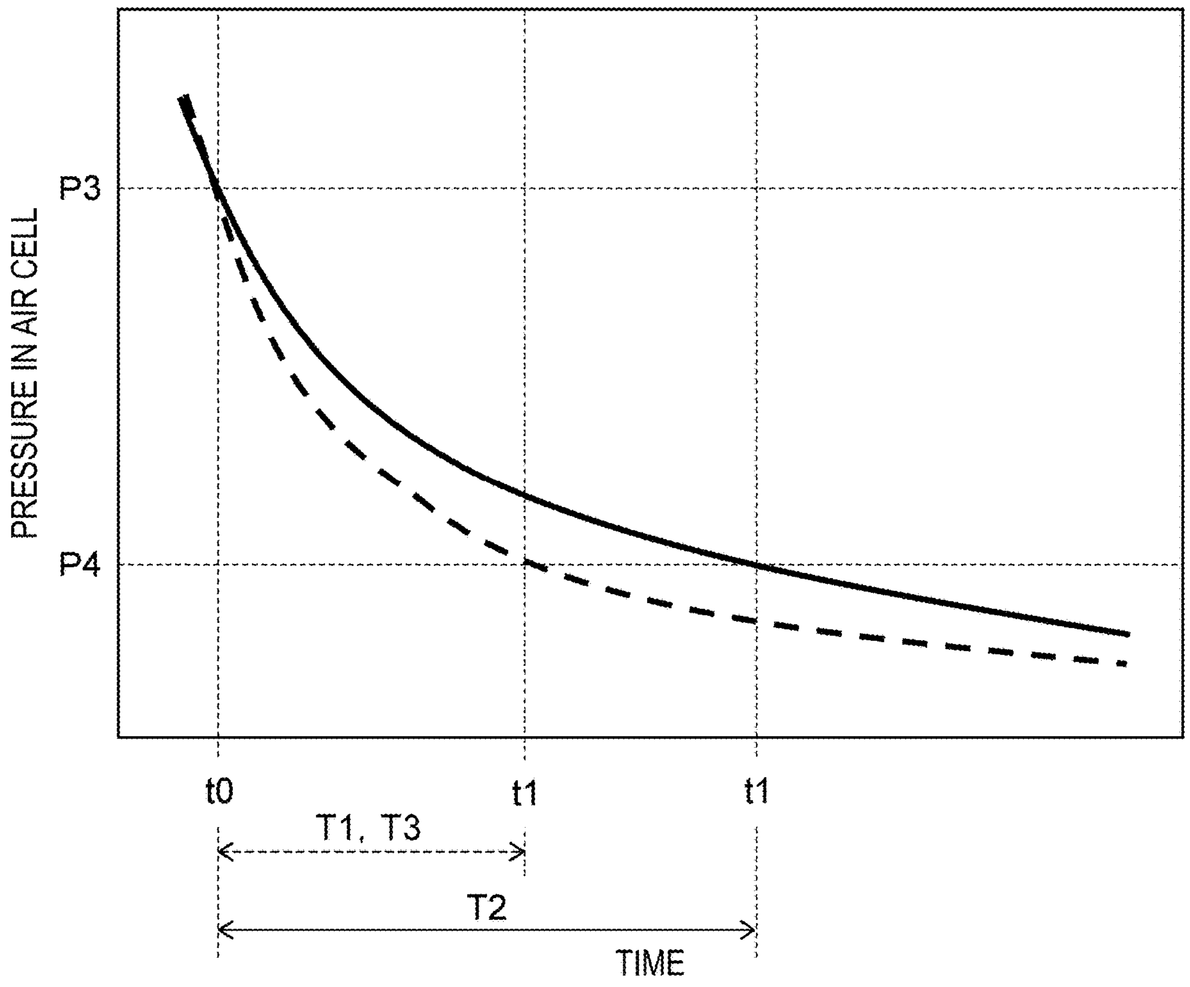
FIG. 5 is a graph illustrating a pressure change when the air is exhausted, in which the horizontal axis represents time and the longitudinal axis represents a pressure in the air cell.

FIG. 5 is a graph illustrating a pressure change when the air is exhausted, in which the horizontal axis represents time and the longitudinal axis represents a pressure in the air cell.

As illustrated in FIG. 5, in the present embodiment, a third pressure P3 and a fourth pressure P4 are set. The third pressure P3 is lower than the first pressure P1 and higher than the second pressure P2. The fourth pressure P4 is lower than the third pressure P3 and higher than the second pressure P2. P1>P3>P4>P2 is obtained. In one example, the first pressure P1 is a pressure obtained by adding approximately 3 kPa (kilopascal) to the atmospheric pressure, the third pressure P3 is a pressure obtained by adding 2 kPa to the atmospheric pressure, the fourth pressure P4 is a pressure obtained by adding 0.7 kPa to the atmospheric pressure, and the second pressure P2 is a pressure obtained by adding 0.4 kPa to the atmospheric pressure. The atmospheric pressure is approximately 101 kPa.

Firstly, the measurement method of the second time T2 illustrated at the step S15 will be described. The controller 60, when implementing the second mode M2 by shifting from the first mode M1, stops the air blowing apparatus 10, causes the solenoid valves 41 and 43 to be in the closed state, and causes the solenoid valve 42 and the solenoid valve 44 to be in the open state. This connects the air cells 32 to the outside. At this time, the user crushes the air cells 32 to discharge the air to the outside from the air cells 32.

As illustrated in FIG. 5, as the air is discharged to the outside from the air cells 32, the pressure in the air cells 32 decreases. The speed of the decrease in the pressure depends on a force to be applied to the air cells 32. The larger force to be applied to the air cells 32 requires the longer time necessary for discharging the air. This is because as the force to be applied to the air cells 32 is larger, the amount of the air to be discharged during when the pressure reaches the fourth pressure P4 from the third pressure P3 is larger, and the time required for the discharge is longer, while the solenoid valve 44 limits the passing speed of the air.

The controller 60 stores time t0 when the measurement value by the pressure sensor 50 has become the third pressure P3. Next, the controller 60 stores time t1 when the measurement value by the pressure sensor 50 has become the fourth pressure P4. The controller 60 calculates the second time T2 (=t1−t0) during when the pressure in the air cell 32 changes from the third pressure P3 to the fourth pressure P4.

The same applies to calculation methods of the third time and the first time. As illustrated at the step S17, the controller 60, when implementing the third mode M3 by shifting from the second mode M2, stops the air blowing apparatus 10, causes the solenoid valves 41 and 42 to be in the closed state, causes the solenoid valve 43 and the solenoid valve 44 to be in the open state, and connects the air cells 33 to the outside. The controller 60 measures the third time T3 (=t1−t0) during when the measurement value by the pressure sensor 50 changes from the third pressure P3 to the fourth pressure P4.

As illustrated at the step S13, the controller 60, when implementing the first mode M1 by shifting from the initial state M0 or the third mode M3, stops the air blowing apparatus 10, causes the solenoid valve 42 and the solenoid valve 43 to be in the closed state, causes the solenoid valves 41 and 44 to be in the open state, and connects the air cells 31 to the outside. The controller 60 measures the first time T1 (=t1−t0) during when the measurement value by the pressure sensor 50 changes from the third pressure P3 to the fourth pressure P4. FIG. 5 illustrates a case where the second time T2 illustrated by the solid line is longer than the third time T3 and the first time T1 illustrated by the dashed line.

Next, a method of determining the position Xs of the sacral region of the user illustrated at the step S19 in FIG. 3 will be described.

In a case where the user U in a supine position sleeps on the motorized bed 100, forces to be applied to the air cells by the user U are different in accordance with sites of the body of the user U. Typically, the largest force is applied to the air cell at the position Xs of the sacral region of the user U. It can be determined that the sacral region of the user U is positioned on the air cell to which the largest force is applied. In other words, specifying an air cell to which the largest force is applied can specify the position Xs of the sacral region.

The controller 60 determines the position Xs of the sacral region by comparing the first time T1, the second time T2, and the third time T3. Specifically, the controller 60 determines that the sacral region of the user is positioned on one air cell 31 when the first time T1 is longer than the second time T2 and the third time T3, determines that the sacral region is positioned on one air cell 32 when the second time T2 is longer than the third time T3 and the first time T1, and determines that the sacral region is positioned on one air cell 33 when the third time T3 is longer than the first time T1 and the second time T2.

Next, a method of determining a relationship between the position Xs of the sacral region and the predetermined position X0 illustrated at the step S20 in FIG. 3 will be described.

Figure 6A:
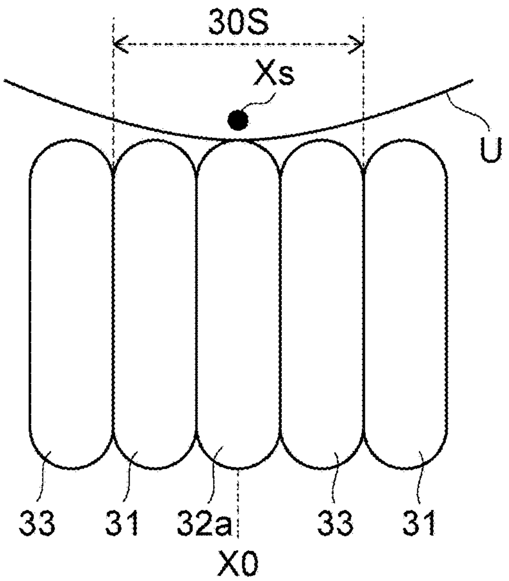
FIGS. 6A to 6C are diagrams each illustrating a positional relationship between the air cell and a sacral region.
Figure 6B:
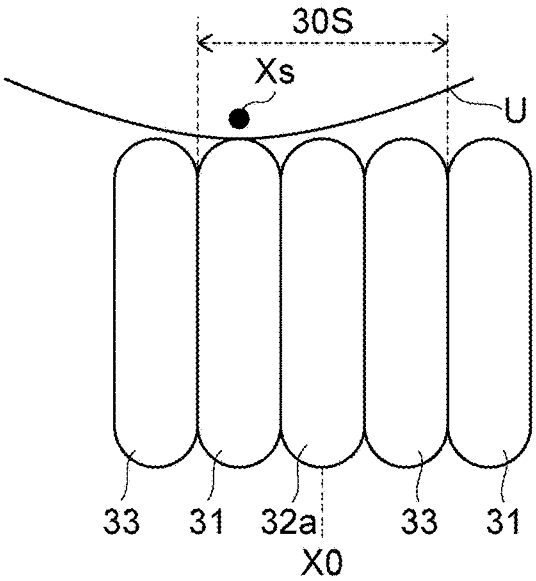
Figure 6C:
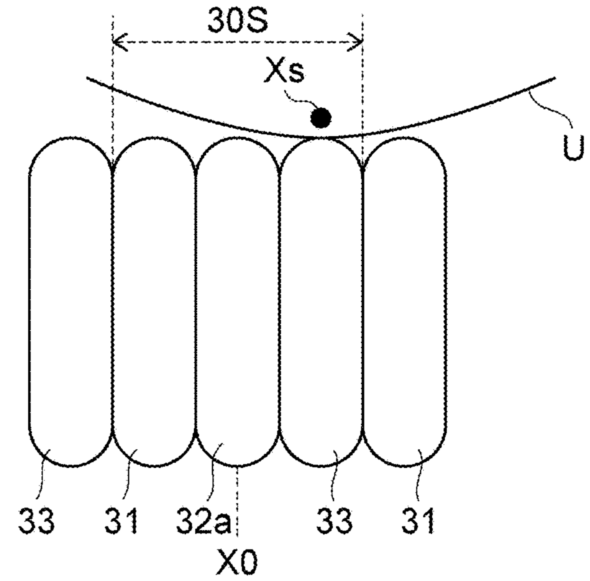

FIG. 6A to 6C are diagrams each illustrating a positional relationship between the air cell and a sacral region.

In the motorized bed 100, the back section 111 is movable relative to the seat section 112. A predetermined relationship is preferably present between a boundary 119 of the back section 111 and the seat section 112, and the position Xs of the sacral region. The sacral region of the user is preferably positioned at the predetermined position X0, which has a certain positional relationship relative to the boundary 119.

If the position Xs of the sacral region of an actual user deviates from the predetermined position X0, when the back section 111 is inclined to perform the back-raising operation, there is a possibility that a part of the body of the user is unnaturally pressed or the body of the user is shifted, thereby providing unpleasant feeling to the user. In a case where the user cannot adjust a balance by himself/herself, there is also a possibility that a suitable posture is not guided. In the present embodiment, as mentioned above, an exhaust from the air cell is used to determine the position Xs of the sacral region.

As illustrated in FIGS. 6A to 6C, in the present embodiment, it is assumed that the predetermined position X0 at which the sacral region of the user U is to be positioned is one (hereinafter, is called "air cell 32*a*") of the air cells 32.

As illustrated in FIG. 6A, in a case where the position Xs of the sacral region of the user U is positioned on the air cell 32*a*, the controller 60 determines that the position Xs coincides with the position X0.

As illustrated in FIG. 6B, in a case where the position Xs of the sacral region of the user U is positioned on the air cell 31 in a group 30S consisting of three air cells of the air cell 32*a*, and the air cell 31 and the air cell 33, which are positioned adjacent to the air cell 32*a*, the controller 60 determines that the position Xs does not coincide with the position X0.

As illustrated in FIG. 6C, in the abovementioned group 30S, in a case where the position Xs of the sacral region of the user U is positioned on the air cell 33 in the group 30S, the controller 60 determines that the position Xs does not coincide with the position X0.

Next, the output of an attention signal illustrated at the step S21 in FIG. 3 will be described.

As mentioned above, the controller 60 determines whether the determined position Xs of the sacral region coincides with the predetermined position X0 to which the sacral region is to be positioned, and outputs an attention signal if the determined position Xs does not coincide with the predetermined position X0. The attention signal is input to a terminal of a care giver or a medical staff (hereinafter, is also called "care giver or the like"), and is displayed thereon.

When the attention signal is displayed, the care giver or the like manually adjusts a position of the body of the user U, and returns the position to a suitable position. An appropriate attention signal is not output in a case where the position Xs of the sacral region deviates from the position X0 beyond the range of the group 30S, but the care giver or the like can visually recognize that the position of the body of the user U is shifted in this case, thereby causing no problem.

The attention signal may include information indicating whether the position Xs of the sacral region is positioned at the head side or positioned at the leg side relative to the predetermined position X0. In a case where the motorized bed 100 is provided with a display, the attention signal may be input into and displayed on the display. Also in a case where the position Xs of the sacral region coincides with the position X0, the controller 60 may output a signal indicating the coincidence.

Next, effects of the present embodiment will be described.

With the present embodiment, the position Xs of the sacral region of the user U can be determined based on exhaust time from the air cell. This allows subtle displacement of the position of the user to be determined. This effect is especially effective in a case where the user uses bedclothes such as a comforter. This allows a care giver or the like to correct the position of the body of the user U in a case where the position Xs of the sacral region is shifted from the predetermined position X0. As a result, when the motorized bed 100 operates, it is possible to suppress providing unpleasant feeling to the user.

With the present embodiment, the bedsore prevention operation is used to determine the position Xs of the sacral region. A dedicated operation for determining the position Xs of the sacral region does not need to be performed. The position Xs of the sacral region can be determined for every cycle of the bedsore prevention operation, so that even if the posture of the user and the state of the motorized bed 100 are changed, the position Xs of the sacral region can be determined by following the change. As a result, the position of the user can be grasped all the time, and an attention signal can be output in a case where the position of the user is shifted. This eliminates the care giver or the like having to excessively pay attention to the position of the user, and reduces burden of the care giver or the like.

Second Embodiment

Figure 7:
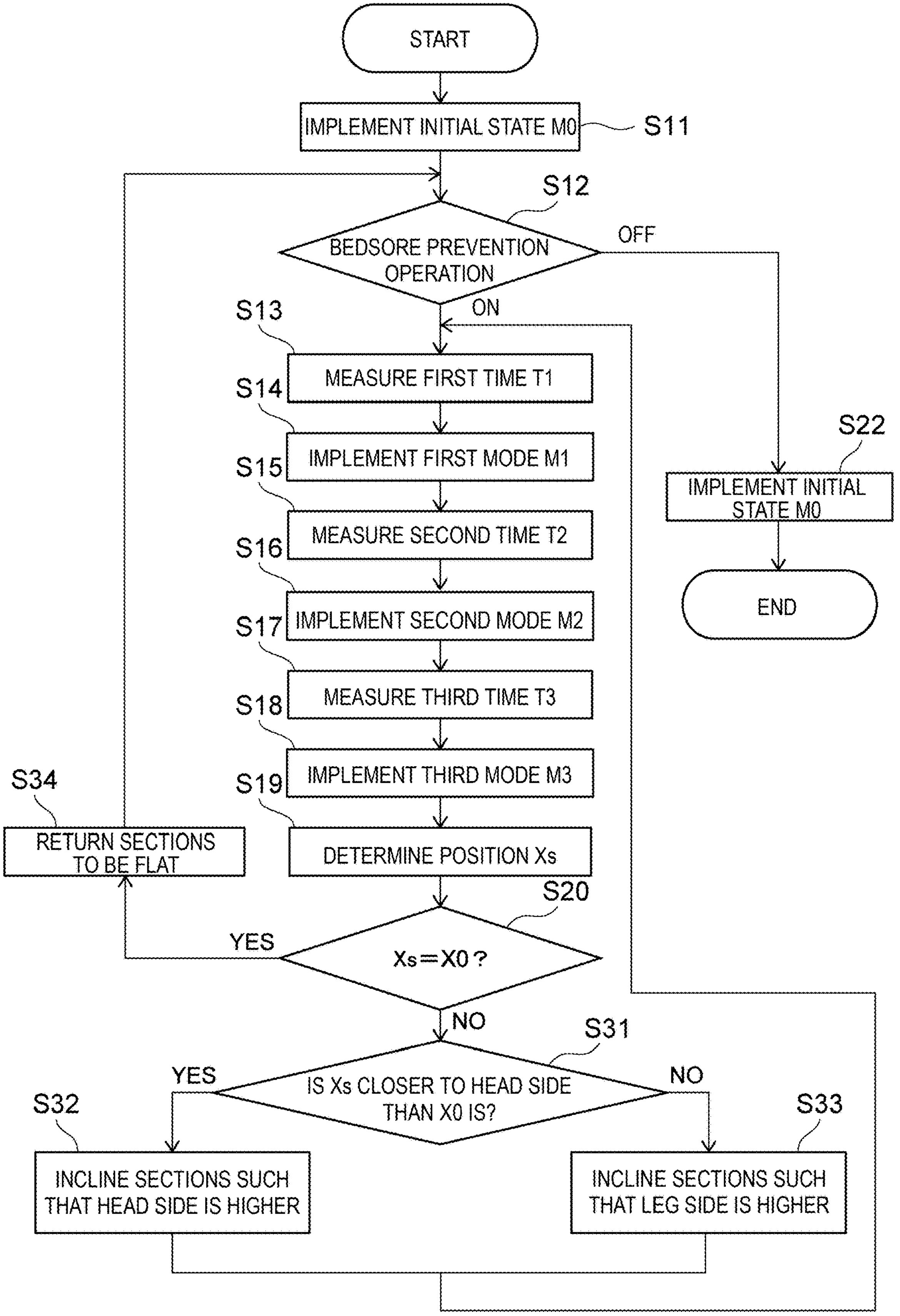
FIG. 7 is a flowchart illustrating an operation of a bed system according to a second embodiment.

FIG. 7 is a flowchart illustrating an operation of a bed system according to the present embodiment.

Figure 8A:
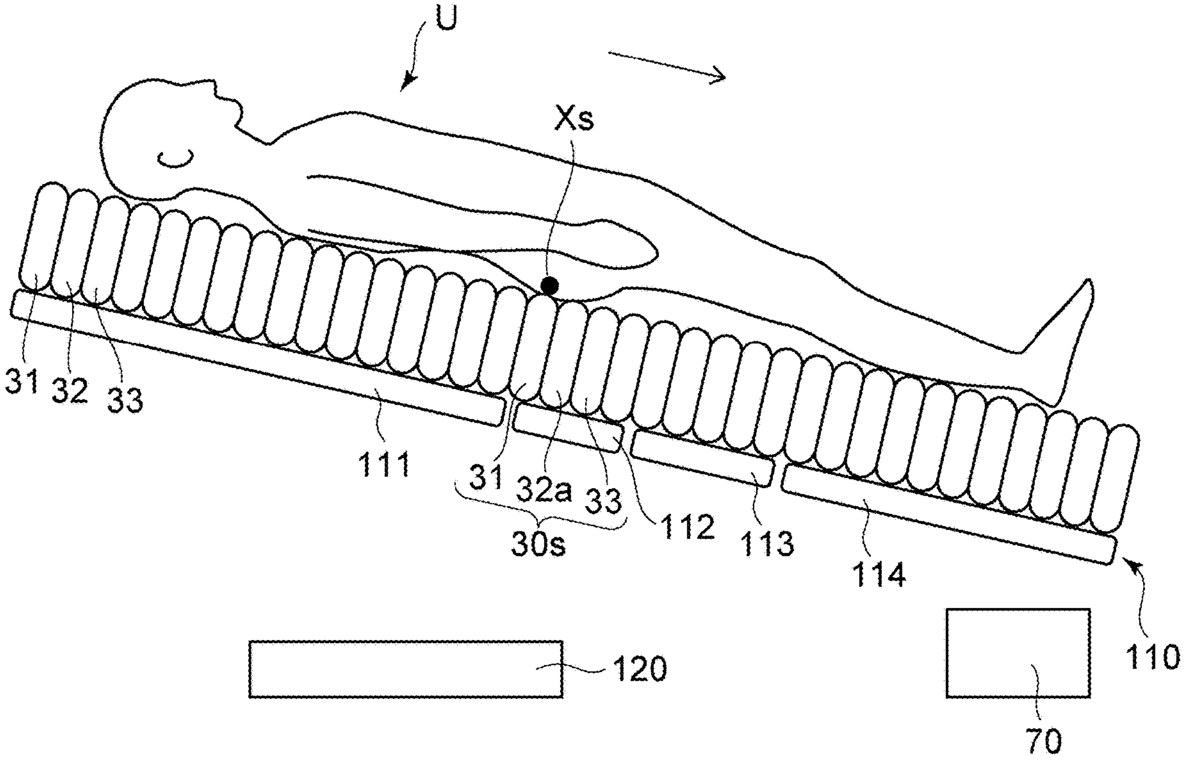
FIGS. 8A and 8B are diagrams each illustrating an operation of the bed system according to the second embodiment.
Figure 8B:
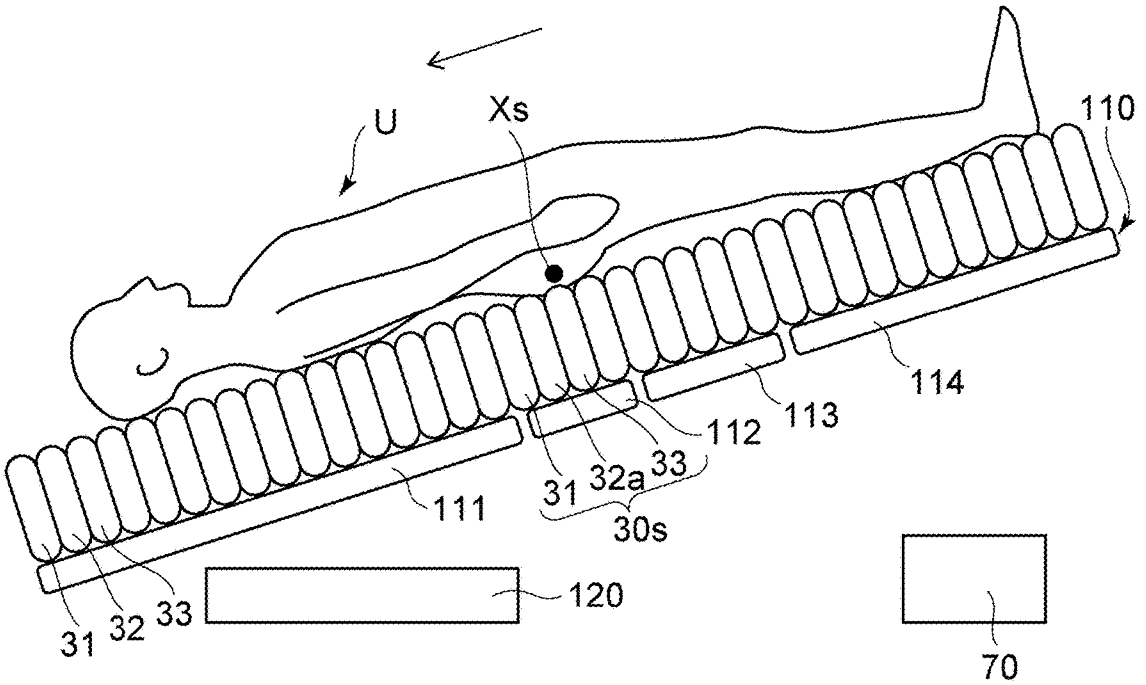

FIGS. 8A and 8B are diagrams each illustrating an operation of the bed system according to the present embodiment.

The configuration of the bed system according to the present embodiment is similar to that in the first embodiment.

In the following description, an example in which the controller 60 of the fluid mattress 1 also controls the actuator 120 of the motorized bed 100 is described, but the controller 60 of the fluid mattress 1 may be separate from a controller of the motorized bed 100.

An operation of the bed system according to the present embodiment will be described hereinafter.

As illustrated in FIG. 7, the controller 60 executes the steps illustrated at the step S11 to the step S20 by a method similar to that in the first embodiment.

At the step S20, if the position Xs of the sacral region is different from the predetermined position X0, the controller 60 causes the operation to proceed to a step S31, and determines whether the position Xs of the sacral region is positioned closer to the head side than the predetermined position X0 is. The case where the position Xs of the sacral region is positioned closer to the head side than the predetermined position X0 is corresponds to a case where the position Xs of the sacral region is positioned directly above the air cell 31 that is present closer to the head side than the air cell 32*a* is, within the range of the group 30S consisting of the three air cells of the air cell 32*a*, and the air cells 31 and 33, which are positioned adjacent to the air cell 32*a*, as illustrated in FIG. 6B. On the other hand, the case where the position Xs of the sacral region is not positioned closer to the head side than the predetermined position X0 is corresponds to a case where the position Xs of the sacral region is positioned directly above the air cell 33 that is present closer to the leg side than the air cell 32*a* is, within the range of the group 30S, as illustrated in FIG. 6 C.

If the position Xs of the sacral region is positioned closer to the head side than the predetermined position X0 is, the controller 60 causes the operation to proceed to a step S32 from the step S31, and causes the actuator 120 to incline the entire sections 110 such that the head side is positioned higher than the leg side, as illustrated in FIG. 8A. This causes the predetermined position X0 to position below the determined position Xs of the sacral region. Thereafter, the controller 60 causes the operation to return to the step S13.

On the other hand, if the position Xs of the sacral region is not positioned closer to the head side than the predetermined position X0 is, in other words, the position Xs is positioned closer to the leg side than the position X0 is, the controller 60 causes the operation to proceed to a step S33 from the step S31, and causes the actuator 120 to incline the entire sections 110 such that the leg side is positioned higher than the head side, as illustrated in FIG. 8B. This also causes the predetermined position X0 to position below the determined position Xs of the sacral region. Thereafter, the controller 60 causes the operation to return to the step S13.

This operation is generally expressed as follows. Among the group 30S consisting of one air cell 31, one air cell 32, and one air cell 33, which are continuously arranged, if one air cell positioned in the center corresponds to the predetermined position X0 at which the sacral region is to be positioned, and one air cell positioned adjacent to the air cell positioned in the center corresponds to the determined position Xs of the sacral region, the controller 60 causes the actuator 120 to incline the sections 110 such that the air cell positioned in the center is positioned below the air cell corresponding to the determined position Xs of the sacral region.

After the controller 60 causes the operation to return to the step S13, the controller 60 continues the bedsore prevention operation as illustrated at the steps S13 to S18. As illustrated in FIG. 3 and FIGS. 4A to 4C, the pressures in the air cells 31 to 33 sequentially decrease to a pressure equal to or lower than the second pressure P2. As a result, with the effect of the gravity, the body of the user U moves downward little by little to cause the position Xs of the sacral region to approach the predetermined position X0. Thereafter, the controller 60 repeats the operations illustrated at the steps S12 to S20 and S31 to S33.

If the position Xs of the sacral region coincides with the predetermined position X0, the controller 60 causes the operation to proceed to a step S34 from the step S20, and causes the actuator 120 to return the sections 110 to be flat. The controller 60 causes the sections 110 to be parallel to the floor. Thereafter, the controller 60 causes the operation to return to the step S12. Thereafter, whether the controller 60 continues the bedsore prevention operation is arbitrary.

Next, effects of the present embodiment will be described.

With the present embodiment, if the position Xs of the sacral region of the user U is shifted from the predetermined position X0, in a state where the actuator 120 has inclined the sections 110, the controller 60 continues the bedsore prevention operation to allow the position of the user U to be automatically corrected to a suitable position.

As a result, for example, in a case where a user who is unable to correct a balance by himself/herself receives care at his/her home, the position of the user can be corrected to a suitable position without care experts in the surrounding. This can reduce burden of a family or the like who performs care in the home care. The position of the user can be corrected without the body of the user being touched, so that in a medical institution or the like, even in a case where a catheter is attached to the body of the user, the position of the user can be corrected while the catheter being prevented from coming off.

In the present embodiment, the example in which the controller 60 does not output an attention signal if the position Xs of the sacral region does not coincide with the predetermined position X0 at the step S20 has been indicated, but the controller 60 may output an attention signal, similar to the first embodiment. This can prevent the care giver or the like from carelessly performing the back-raising operation in a case where the position of the user is not suitable. The attention signal may include information indicating that the bed system is automatically correcting the position of the user. The configurations, operations, and effects other than the above in the present embodiment are similar to those in the first embodiment.

Third Embodiment

Figure 9A:
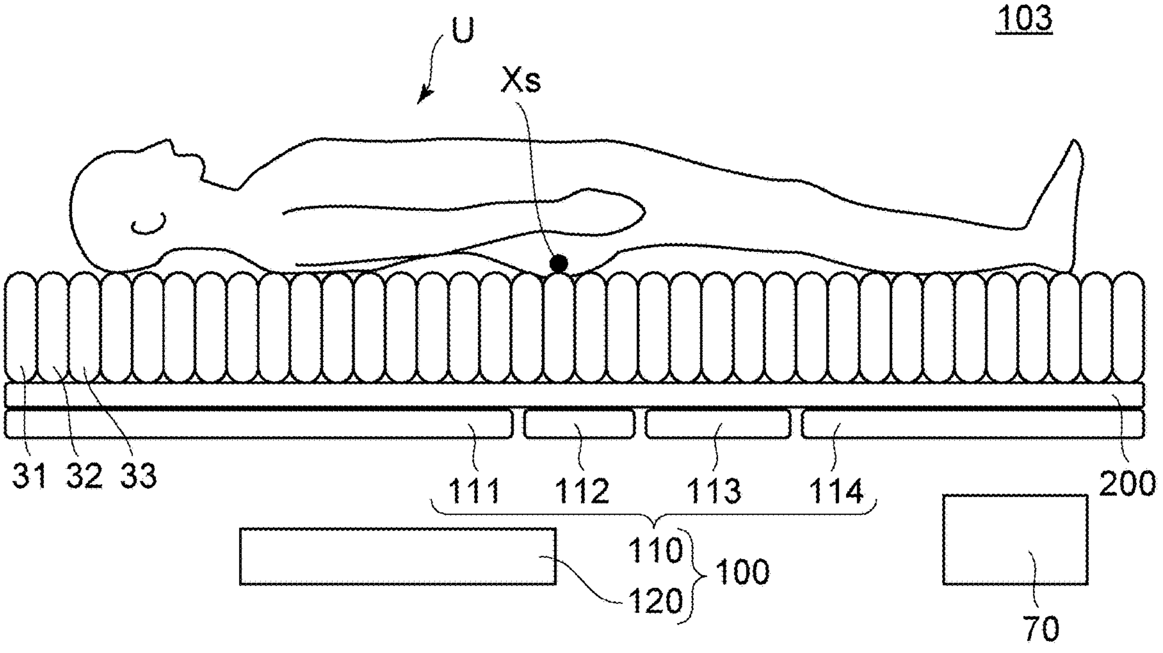
FIG. 9A is a diagram illustrating a bed system according to a third embodiment.
Figure 9B:
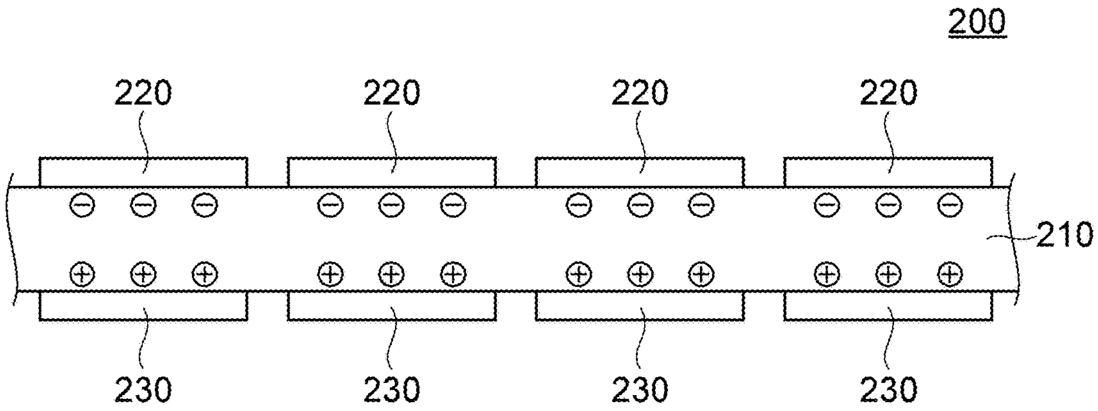
FIG. 9B is a partial enlargement cross-sectional diagram illustrating a position sensor.

FIG. 9A is a diagram illustrating a bed system according to the present embodiment, and FIG. 9B is a partial enlargement cross-sectional diagram illustrating a position sensor.

As illustrated in FIG. 9A, a bed system 103 according to the present embodiment is provided with a position sensor 200 between the sections 110 and the air cells 31 to 33, in addition to the bed system 101 (see FIG. 1A) according to the first embodiment. The position sensor 200 detects a body weight of the user U through the air cells 31 to 33 to detect the position Xs of the sacral region of the user U on the sections 110.

As illustrated in FIG. 9B, the position sensor 200 is a pressure distribution sensor that uses the capacitance, for example. The position sensor 200 is provided with an urethane foam 210, a plurality of anode electrodes 220 are provided on one surface of the urethane foam 210, for example, on an upper surface, and a plurality of cathode electrodes 230 are provided on the other surface of the urethane foam 210, for example, on a lower surface. The anode electrodes 220 and the cathode electrodes 230, which are paired in a one-to-one relationship, constitute a capacitor via the urethane foam 210.

When a load is locally applied to the position sensor 200 to compress the urethane foam 210, a distance between the anode electrode 220 and the cathode electrode 230 in that portion becomes short to increase the capacitance. This allows the position sensor 200 to measure the pressure distribution. The position sensor 200 is not limited to the sensor that uses the capacitance.

Next, an operation of the bed system according to the present embodiment will be described.

Figure 10:
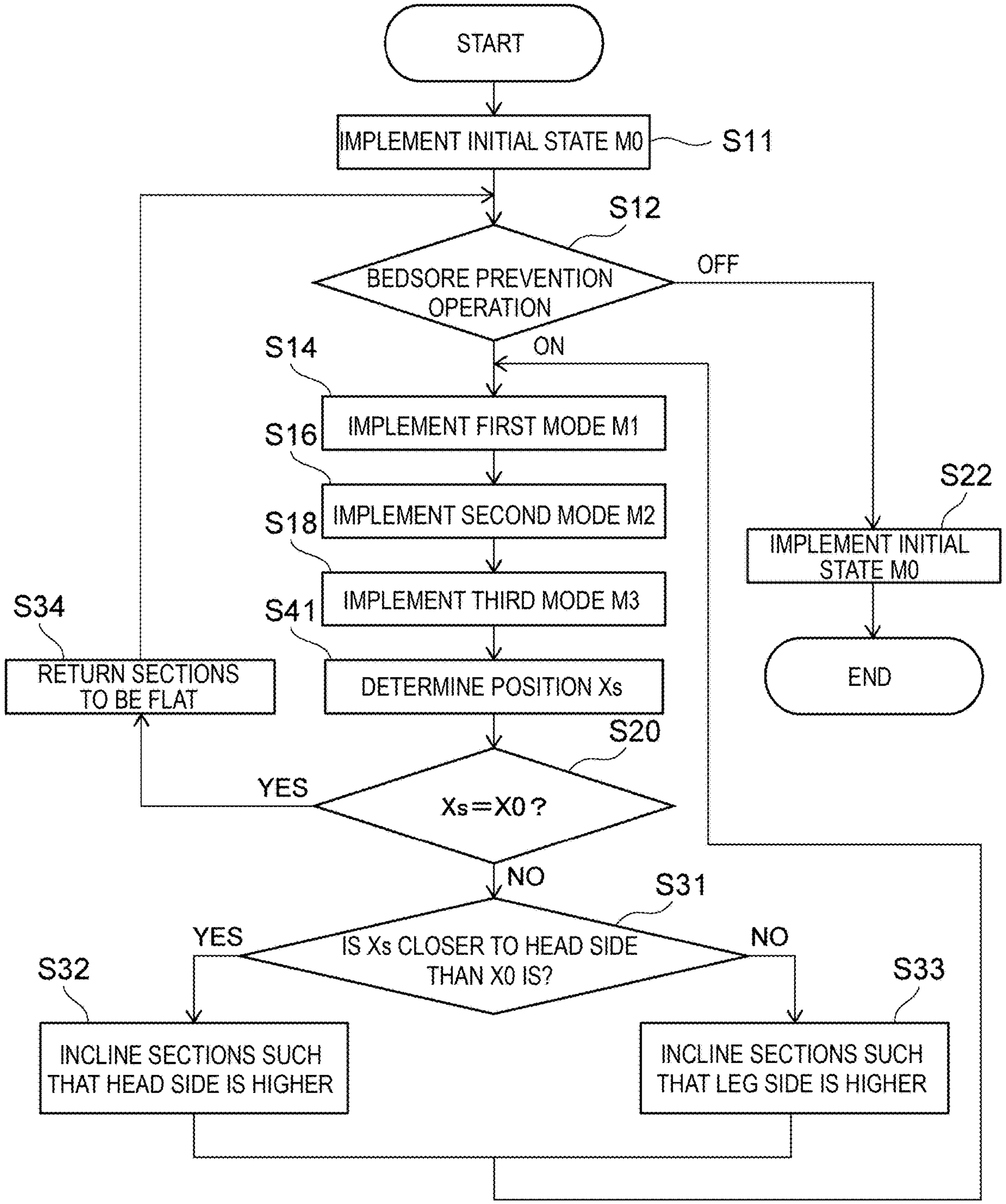
FIG. 10 is a flowchart illustrating an operation of the bed system according to the third embodiment.

FIG. 10 is a flowchart illustrating an operation of the bed system according to the present embodiment.

As illustrated at the step S11 in FIG. 10, the controller 60 implements the initial state M0, and executes a step to implement the first mode M1 illustrated at the step S14, a step to implement the second mode M2 illustrated at the step S16, and, a step to implement the third mode M3 illustrated at the step S18 if the bedsore prevention operation is on. At this time, the controller 60 does not measure the first time T1, the second time T2, and the third time T3.

Next, as illustrated at a step S41, the controller 60 determines the position Xs of the sacral region of the user U. At this time, the controller 60 determines the position Xs of the sacral region based on a detection result by the position sensor 200, without comparing the first time T1, the second time T2, and the third time T3 with one another. For example, the controller 60 determines a portion detected as having the highest pressure by the position sensor 200, as the position Xs of the sacral region. The operation thereafter is similar to that in the second embodiment.

Also in the present embodiment, similar to the second embodiment, if the position of the user U is shifted, the shift can be detected and automatically corrected. The configurations, operations, and effects other than the above in the present embodiment are similar to those in the second embodiment.

The aforementioned respective embodiments are examples embodying the present disclosure, and the present disclosure is not limited to these embodiments. For example, in each of the aforementioned embodiments, the present disclosure also includes additions, deletions, or modifications of some elements or steps.

For example, each of the aforementioned embodiments has indicated the example in which three lines of air cells are provided, but is not limited thereto. Two, or four or more lines of the air cells may be provided. Each of the aforementioned embodiments has indicated the example in which a plurality of air cells are arranged along one direction from a head side toward a leg side of a motorized bed, but is not limited thereto, the plurality of air cells may be arranged along a horizontal direction. For example, each of the aforementioned embodiments has indicated the example in which the air is used as a fluid to drive the cell, but is not limited thereto. For example, as a fluid, water, gel, or oil may be used. Each air cell having a suitable size in accordance with a portion to be arranged on the bed and a function to be required is selected as appropriate, and even in one fluid mattress, a plurality of air cells having different sizes may be used in combination.

The present disclosure includes the following aspects.

APPENDIX 1

A fluid mattress including:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of a measurement result by the pressure sensor, and controls the fluid supply unit, the first solenoid valve, the second solenoid valve, the third solenoid valve, and the external solenoid valve, in which, the controller can implement a first mode in which a pressure in the second cell and a pressure in the third cell are set to be a first pressure, and a pressure in the first cell is set to be equal to or lower than a second pressure lower than the first pressure, a second mode in which a pressure in the third cell and a pressure in the first cell are set to be the first pressure, and a pressure in the second cell is set to be equal to or lower than the second pressure, and a third mode in which a pressure in the first cell and a pressure in the second cell are set to be the first pressure, and a pressure in the third cell is set to be equal to or lower than the second pressure, the controller when implementing the first mode by shifting from the third mode, stops the fluid supply unit, causes the second solenoid valve and the third solenoid valve to be in a closed state, causes the first solenoid valve and the external solenoid valve to be in an open state, and measures first time during when a measurement value by the pressure sensor changes from a third pressure lower than the first pressure and higher than the second pressure to a fourth pressure lower than the third pressure and higher than the second pressure, when implementing the second mode by shifting from the first mode, stops the fluid supply unit, causes the third solenoid valve and the first solenoid valve to be in a closed state, causes the second solenoid valve and the external solenoid valve to be in an open state, and measures second time during when a measurement value by the pressure sensor changes from the third pressure to the fourth pressure, and when implementing the third mode by shifting from the second mode, stops the fluid supply unit, causes the first solenoid valve and the second solenoid valve to be in a closed state, causes the third solenoid valve and the external solenoid valve to be in an open state, and measures third time during when a measurement value by the pressure sensor changes from the third pressure to the fourth pressure, determines that a sacral region of a user is positioned on the first cell when the first time is longer than the second time and the third time, determines that the sacral region is positioned on the second cell when the second time is longer than the third time and the first time, and determines that the sacral region is positioned on the third cell when the third time is longer than the first time and the second time.

APPENDIX 2

The fluid mattress according to Appendix 1, in which the controller repeatedly implements the first mode, the second mode, and the third mode.

APPENDIX 3

The fluid mattress according to Appendix 1 or 2, in which the controller outputs an attention signal when a position of the sacral region determined by the controller is different from a predetermined position.

APPENDIX 4

A bed system including:

sections;

an actuator that inclines the sections; and the fluid mattress according to any one of Appendixes 1 to 3, in which the first cell, the second cell, and the third cell are arranged repeatedly on the sections from a head side toward a leg side, and the controller causes, among a group consisting of the one first cell, the one second cell, and the one third cell continuously arranged, when the cell positioned in a center corresponds to a predetermined position at which the sacral region is to be positioned, and the cell positioned adjacent to the cell positioned in the center corresponds to the determined position of the sacral region, the actuator to incline the sections such that the cell positioned in the center is positioned below the cell corresponding to the determined position of the sacral region.

APPENDIX 5

The bed system according to Appendix 4, in which the sections include:

a seat section; and a back section movable relative to the seat section, and a certain positional relationship is present between a boundary of the seat section and the back section, and the predetermined position.

APPENDIX 6

A bed system including:

sections;

an actuator that inclines the sections;

a position sensor that detects a position of a sacral region of a user on the sections; and a fluid mattress, in which the fluid mattress includes:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of measurement results by the position sensor and the pressure sensor, and controls the fluid supply unit, the first solenoid valve, the second solenoid valve, the third solenoid valve, and the external solenoid valve, the first cell, the second cell, and the third cell are arranged repeatedly on the sections from a head side toward a leg side, the controller can implement a first mode in which a pressure in the second cell and a pressure in the third cell are set to be a first pressure, and a pressure in the first cell is set to be equal to or lower than a second pressure lower than the first pressure, a second mode in which a pressure in the third cell and a pressure in the first cell are set to be the first pressure, and a pressure in the second cell is set to be equal to or lower than the second pressure, and a third mode in which a pressure in the first cell and a pressure in the second cell are set to be the first pressure, and a pressure in the third cell is set to be equal to or lower than the second pressure, and the controller causes, among a group consisting of the one first cell, the one second cell, and the one third cell continuously arranged, when the cell positioned in a center corresponds to a predetermined position at which the sacral region is to be positioned, and the cell positioned adjacent to the cell positioned in the center corresponds to the detected position of the sacral region by the position sensor, the actuator to incline the sections such that the cell positioned in the center is positioned below the cell corresponding to the detected position of the sacral region.

APPENDIX 7

The bed system according to Appendix 6, in which the sections include:

a seat section; and a back section movable relative to the seat section, and a certain positional relationship is present between a boundary of the seat section and the back section, and the predetermined position.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fluid mattress comprising:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of a measurement result by the pressure sensor, and controls the fluid supply unit, the first solenoid valve, the second solenoid valve, the third solenoid valve, and the external solenoid valve, wherein the controller can implement a first mode in which a pressure in the second cells and a pressure in the third cells are set to be a first pressure, and a pressure in the first cells is set to be equal to or lower than a second pressure lower than the first pressure, a second mode in which a pressure in the third cells and a pressure in the first cells are set to be the first pressure, and a pressure in the second cells is set to be equal to or lower than the second pressure, and a third mode in which a pressure in the first cells and a pressure in the second cells are set to be the first pressure, and a pressure in the third cells is set to be equal to or lower than the second pressure, the controller when implementing the first mode by shifting from the third mode, stops the fluid supply unit, causes the second solenoid valve and the third solenoid valve to be in a closed state, causes the first solenoid valve and the external solenoid valve to be in an open state, and measures a first time during when a measurement value by the pressure sensor changes from a third pressure lower than the first pressure and higher than the second pressure to a fourth pressure lower than the third pressure and higher than the second pressure, when implementing the second mode by shifting from the first mode, stops the fluid supply unit, causes the third solenoid valve and the first solenoid valve to be in a closed state, causes the second solenoid valve and the external solenoid valve to be in an open state, and measures a second time during when a measurement value by the pressure sensor changes from the third pressure to the fourth pressure, and when implementing the third mode by shifting from the second mode, stops the fluid supply unit, causes the first solenoid valve and the second solenoid valve to be in a closed state, causes the third solenoid valve and the external solenoid valve to be in an open state, and measures a third time during when a measurement value by the pressure sensor changes from the third pressure to the fourth pressure, determines that a sacral region of a user is positioned on one first cell when the first time is longer than the second time and the third time, determines that the sacral region is positioned on one second cell when the second time is longer than the third time and the first time, and determines that the sacral region is positioned on one third cell when the third time is longer than the first time and the second time.

2. The fluid mattress according to claim 1, wherein the controller repeatedly implements the first mode, the second mode, and the third mode.

3. The fluid mattress according to claim 1, wherein the controller outputs an attention signal when a position of the sacral region determined by the controller is different from a predetermined position.

4. A bed system comprising:

sections;

an actuator that inclines the sections; and the fluid mattress according to claim 1, wherein the first cells, the second cells, and the third cells are arranged repeatedly on the sections from a head side toward a leg side of the bed system, and the controller causes, among a group consisting of one first cell, one second cell, and one third cell continuously arranged, when the cell positioned in a center of the group corresponds to a predetermined position at which the sacral region is to be positioned, and a cell positioned adjacent to the cell positioned in the center corresponds to the determined position of the sacral region, the actuator to incline the sections such that the cell positioned in the center is positioned below the cell corresponding to the determined position of the sacral region.

5. The bed system according to claim 4, wherein the sections include:

a seat section; and a back section movable relative to the seat section, and a certain positional relationship is present between a boundary of the seat section and the back section, and the predetermined position.

6. A bed system comprising:

sections;

an actuator that inclines the sections;

a position sensor that detects a position of a sacral region of a user on the sections; and a fluid mattress, wherein the fluid mattress includes:

a fluid supply unit capable of suppling a fluid;

a fluid path into which the fluid is supplied from the fluid supply unit;

a plurality of first cells connected to each other;

a plurality of second cells connected to each other;

a plurality of third cells connected to each other;

a first solenoid valve including a first end connected to the plurality of first cells and a second end connected to the fluid path;

a second solenoid valve including a first end connected to the plurality of second cells and a second end connected to the fluid path;

a third solenoid valve including a first end connected to the plurality of third cells and a second end connected to the fluid path;

an external solenoid valve including a first end connected to an outside and a second end connected to the fluid path;

a pressure sensor that measures a pressure of the fluid in the fluid path; and a controller that receives input of measurement results by the position sensor and the pressure sensor, and controls the fluid supply unit, the first solenoid valve, the second solenoid valve, the third solenoid valve, and the external solenoid valve, the first cells, the second cells, and the third cells are arranged repeatedly on the sections from a head side toward a leg side of the bed system, the controller can implement a first mode in which a pressure in the second cells and a pressure in the third cells are set to be a first pressure, and a pressure in the first cells is set to be equal to or lower than a second pressure lower than the first pressure, a second mode in which a pressure in the third cells and a pressure in the first cells are set to be the first pressure, and a pressure in the second cells is set to be equal to or lower than the second pressure, and a third mode in which a pressure in the first cells and a pressure in the second cells are set to be the first pressure, and a pressure in the third cells is set to be equal to or lower than the second pressure, and the controller causes, among a group consisting of one first cell, one second cell, and one third cell continuously arranged, when the cell positioned in a center of the group corresponds to a predetermined position at which the sacral region is to be positioned, and a cell positioned adjacent to the cell positioned in the center corresponds to the detected position of the sacral region by the position sensor, the actuator to incline the sections such that the cell positioned in the center is positioned below the cell corresponding to the detected position of the sacral region.

7. The bed system according to claim 6, wherein the sections include:

a seat section; and a back section movable relative to the seat section, and a certain positional relationship is present between a boundary of the seat section and the back section, and the predetermined position.

* * * * *